(12) United States Patent
Circus et al.

(10) Patent No.: US 11,729,069 B2
(45) Date of Patent: Aug. 15, 2023

(54) VISUALIZING COMMUNICATION NETWORKS USING SOCIAL NETWORKING ALGORITHMS

(71) Applicant: SKYBOX SECURITY, INC., San Jose, CA (US)

(72) Inventors: Ravid Circus, Kfar Saba (IL); Yaron Chen, Hod Hasharon (IL); Ron Davidson, Herzliya (IL)

(73) Assignee: SKYBOX SECURITY, INC., San Jose, CA (US)

( * ) Notice: Subject to any disclaimer, the term of this patent is extended or adjusted under 35 U.S.C. 154(b) by 0 days.

(21) Appl. No.: 17/090,847

(22) Filed: Nov. 5, 2020

(65) Prior Publication Data

US 2021/0152438 A1 May 20, 2021

Related U.S. Application Data

(60) Provisional application No. 62/930,600, filed on Nov. 5, 2019.

(51) Int. Cl.
*H04L 41/22* (2022.01)
*H04L 41/0893* (2022.01)
*H04L 41/12* (2022.01)

(52) U.S. Cl.
CPC .......... *H04L 41/22* (2013.01); *H04L 41/0893* (2013.01); *H04L 41/12* (2013.01)

(58) Field of Classification Search
CPC ...... H04L 41/22; H04L 41/0893; H04L 41/12

USPC .......................................................... 709/223
See application file for complete search history.

(56) References Cited

U.S. PATENT DOCUMENTS

| | | | | |
|---|---|---|---|---|
| 2005/0134607 | A1* | 6/2005 | Purdy | G06T 11/206 345/629 |
| 2007/0286218 | A1* | 12/2007 | Zhang | H04L 41/145 370/401 |
| 2020/0169474 | A1* | 5/2020 | Nagarkar | H04L 43/045 |

\* cited by examiner

*Primary Examiner* — Emmanuel L Moise
*Assistant Examiner* — Zia Khurshid
(74) *Attorney, Agent, or Firm* — Reches Patents

(57) ABSTRACT

A method that may include receiving network information indicative of (a) network elements that comprise edge network element, (b) connectivity between the network elements, and (c) connectivity of edge network elements to one or more other networks; and generating a visual representation of the network, the visual representation comprises multiple layers, each layer comprises one or more of the network elements of the network, wherein different layers are associated with different importance values; wherein the visual representation is associated with selection metadata for selecting which part out of multiple parts of the visual representation to display, wherein each part comprises at least a part of a single layer the multiple layers.

14 Claims, 10 Drawing Sheets

Prior art

```
For (i=0; i< hosts.number; i++)
    For (j=i; j< host.number;j++)
        if identical(i,j) group (i,j);

function identical(host a,host b)
{ // assuming a is the host that has a lower number of networks connected
    For (i=0; I < a.length; i++) {
        If (!ingnor_network(a[i]) { ignored ++ ; continue; }
            For (j=0;j< b.length; j++) {
                If ((!ingnor_network(b[j]) continue;
                If (a[i] == b[j]) {score++; break; }
            }

If (score/(a.length-ignored) > threshold) return true;
    Else return false
}
```

```
For (i=0; i< edge.number; i++)
    For (j=I; j< edge.number;j++)
        if identical(i,j) group (I,j);

identical(edge a, edge b)
{
    if (number_of_connections(a) != number_of_connections(b)) return false;
    For (i=0; I < a.length; i++) {
        Flag = flase;
        For (j=0;j< b.length; j++) {
            If (a[i] ==(b[j]) { flag = true; continue; }
        If (!flag) return false;
    }
    return true;
}
```

VISUALIZING COMMUNICATION NETWORKS USING SOCIAL NETWORKING ALGORITHMS

CROSS REFERENCE

This application claims priority from U.S. provisional patent Ser. No. 62/930,060 filing date Nov. 5, 2019 which is incorporated herein by reference.

BACKGROUND

Network security experts and administrators are tasked with managing communications networks in a secure way. A major factor in their ability to carry out the various aspects of their role, they must develop a good understanding of the network structure, the relationships between the various components and the rules that govern the traffic in the network. Effective management of network security is therefore directly related to the ability to quickly comprehend the topology of the network. The ability to get visual cues to this topology, to demonstrate the structure in a clear visual way, is a great asset to such experts.

Visualizing large communication networks is a very complex task, as the network graph is often composed of thousands of network node s, connected in a mesh or semi-mesh topology with hundreds of thousands of relationships.

Drawing the graph where all the network nodes and arcs are visual creates a messy drawing—see prior art representation 11 of FIG. 1.

There is a growing need to simplify the visualization of the network.

SUMMARY

The following detailed description refers to the accompanying drawings. Wherever possible, the same reference numbers are used in the drawings and the following descriptions to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 illustrates a pseudo code for cluster host grouping;
FIG. 6 illustrates a pseudo code for grouping networks after cluster host grouping.

DETAILED DESCRIPTION OF THE DRAWINGS

Figure 1:
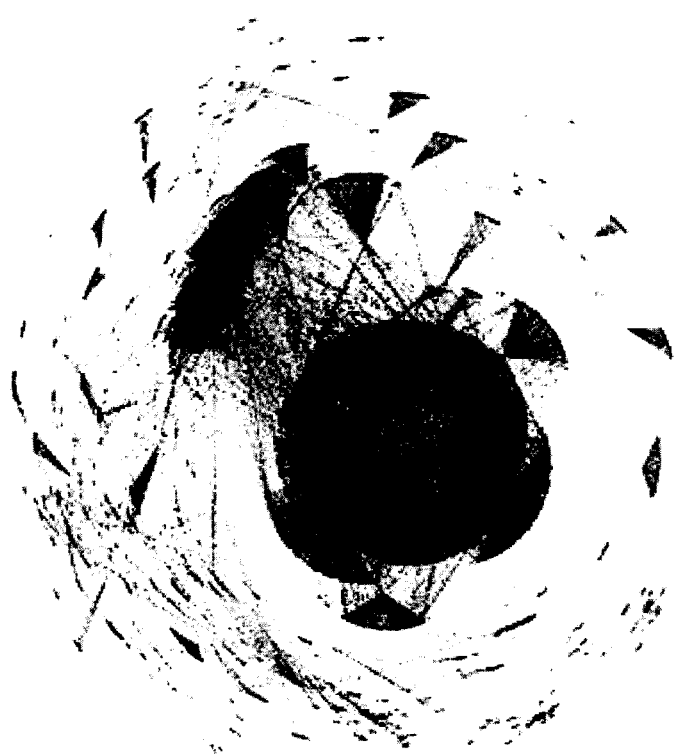
FIG. 1 illustrates a prior art representation of a network.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Host is an example of a network element. Any reference to a host may be applied to any network element.

There is provided a solution (method, system, computer readable medium) that simplifies the representation of the network by drawing of the graph, by dividing the graph into layers.

The simplification of the network provides a more compact visual representation that is easier to store, process and display and thus saves computerized resources. The capability to store and display only parts of the visual representation of the network further saves computational and memory responses and may even allow to cache the relevant part of the visual representation and/or store in RAM memory thereby speeding up the display of the part. The visual representation greatly simplifies the understanding, by a user, of the network parts and status—and thus provide yet another technical improvement.

The representation of the network may include an upper layer that may include a visual representation of the most important parts of the network. The importance may be determined, at least in part, on structural metadata such as the roles of elements in the network (e.g., the connection to the Internet, major data centers, cloud providers infrastructure like AWS, etc.). Each upper layer item can be a single network node (like a connection to the internet), a group of network nodes or a group of groups of network nodes.

The following text illustrates how to create a tree graph, which describes the groups and the layers, of a given communication network graph. The algorithm may assume that communication networks are built with a logic similar to the connections between people in a social network. Network nodes are connected based on physical proximity, role in the network, natural tendency for hyper-connectivity or relative isolation, etc. By using social networking algorithms, the solution can divide the communication network into groups and layers which are visually understood.

The simplified representation assists a network security expert in understanding the network and its properties, and also provides technical benefits, as the resources (CPU, memory) required to handle a hierarchical structure, of which only a limited number of network nodes and edges are presented to the users at any one time, are far smaller than those needed for visualization of the entire network at once. The solution also provides a fast paging between layers, effective drill-down options and flexibility in various aspects of the implementation.

There may be provided a method that generated a network representation by performing multiple clustering iterations. A clustering iteration may receive a current model of the network and generate the next model of the network. The network nodes of the current are clustered based on topological similarities between one or more hosts of network nodes of the current model.

A model of a network may also be referred to as a model.

A clustering iteration may include merging edge network nodes connected to a same network node. Merge operations of network nodes that are not edge network may also be included in a clustering iteration.

After the completion of the clustering iterations—the network nodes of the model generated by the clustering iterations are allocated to different layers of a visual representation of the network—and optionally various connectivity information is added to the visual representation.

The following text illustrates various examples of clustering iterations (also referred to as phases). Different examples and/or combinations of clustering iterations may be provided.

First Stage—Folding the Edge Hosts Into the "Root" Network

Figure 2:
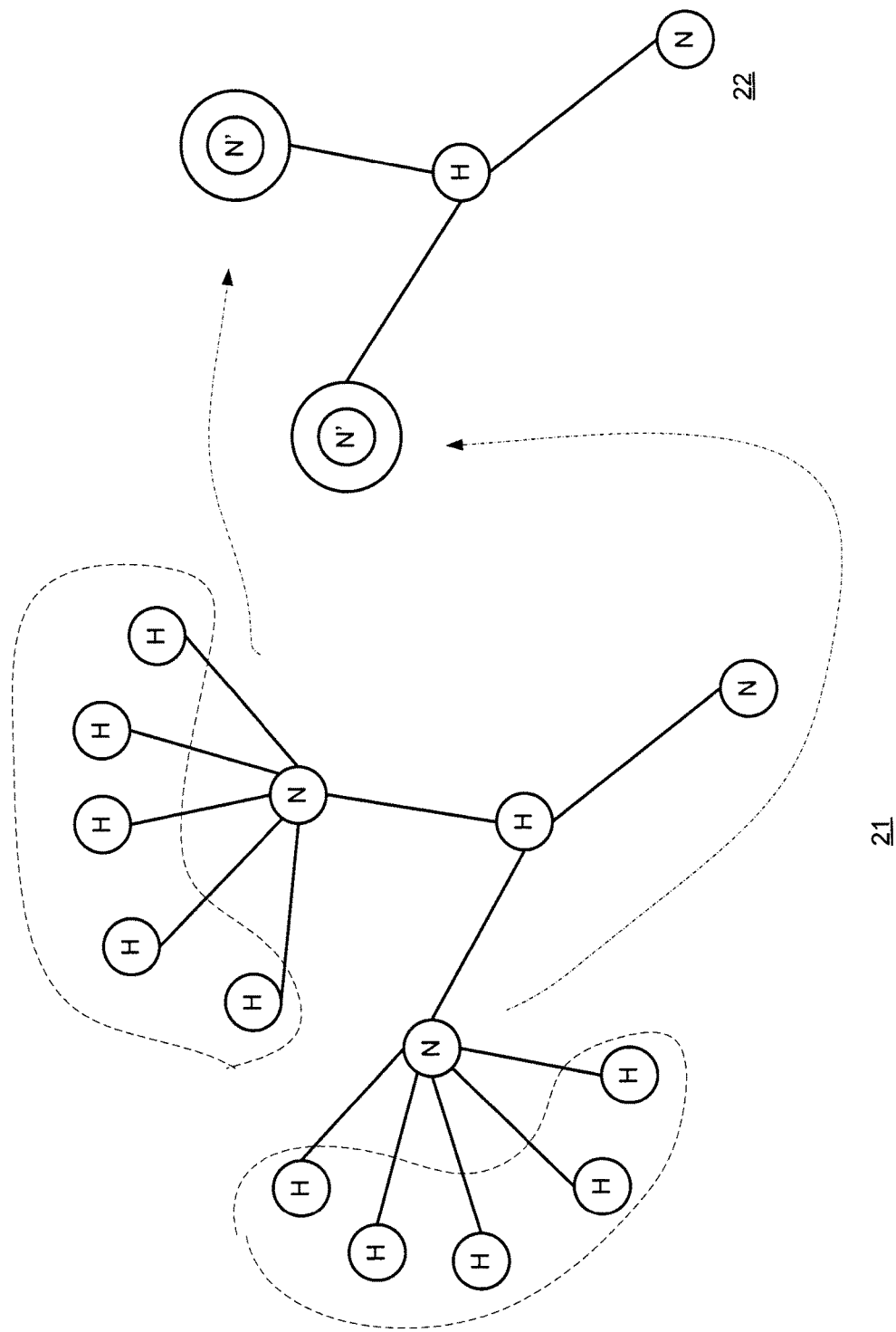
FIG. 2 illustrates a grouping of the "end point" host.

This is the initial part of the method where all hosts at the edges of the network (connected only to a single network node) are grouped with their root network, as seen in FIG. 2—converting graph 21 to graph 22.

This may involve starting with "leafs"—end-network nodes connected to a single other network node, and to fold/merge these network nodes with the network node they are connected to. In a sense, these edge network nodes may be of marginal importance, low-connectivity, peripheral. This grouping is an easy task and it reduces the graph size by 10-30%, on average. The result of this action is a new graph 22 where all edge network nodes of the network are groups of hosts and 1-connected-networks, as seen in FIG. 2.

Second Stage—Clustering Hosts Based on Topological Similarity

Many communication networks use clustering for redundancy, in order to avoid a Single Point of Failure. The networking expert expects to visualize the two clustered hosts (often these are hosts that serve as clustered gateways, intermediate hosts in the network) as a single host, with an indication that there is cluster solution hiding behind it. Moreover, since cluster solutions usually include a direct connection between the clustered gateways, the original graph might have a duplication that confuses and inflicts on the user experience.

Finding a cluster in the graph is not an easy task since the graph needs to be scanned for Topological Similarity between two host connections ($n^2$ complexity).

Topological Similarity may require that two clustered hosts have the exact connections to some other hosts—but two hosts may be clustered even when they differ in connectively by a tolerable amount which can be measured by an Identity parameter.

The process needs to create some measure that defines the similarity between two potential cluster hosts. This is "identity". The identity value is calculated in percentage and it is calculated according to the following formula:

$$\text{Identity} = \frac{(\text{number of identical connection}) * 100}{(\text{Number of connection of the host with minimal connections}) - (\text{ignored networks})}$$

Where:

Number of Identical connections is the number of identical connections the two hosts under test have.

Ignored networks are networks whose physical connection is different from their logical connection like MPLS or VPN networks.

Since there is no way to know their logical connection, the identity criterion might include network nodes that are not locally connected but are physically connected and for that reason these networks are ignored.

The algorithm may require a definition for identifying ignored networks. The process can take the information from the network name or add a definition to the sbv_network table (an internal table describing network nodes attributes).

Number of connections in the host with minimal connections the number of connections in the host with the minimal connection value (minimal out of all network elements).

From experiments with several real communication networks the process has set the required identity value for clusters to be of 95%. Other thresholds may be used. The threshold may, for example, depend on the host with minimal connections.

Figure 3:
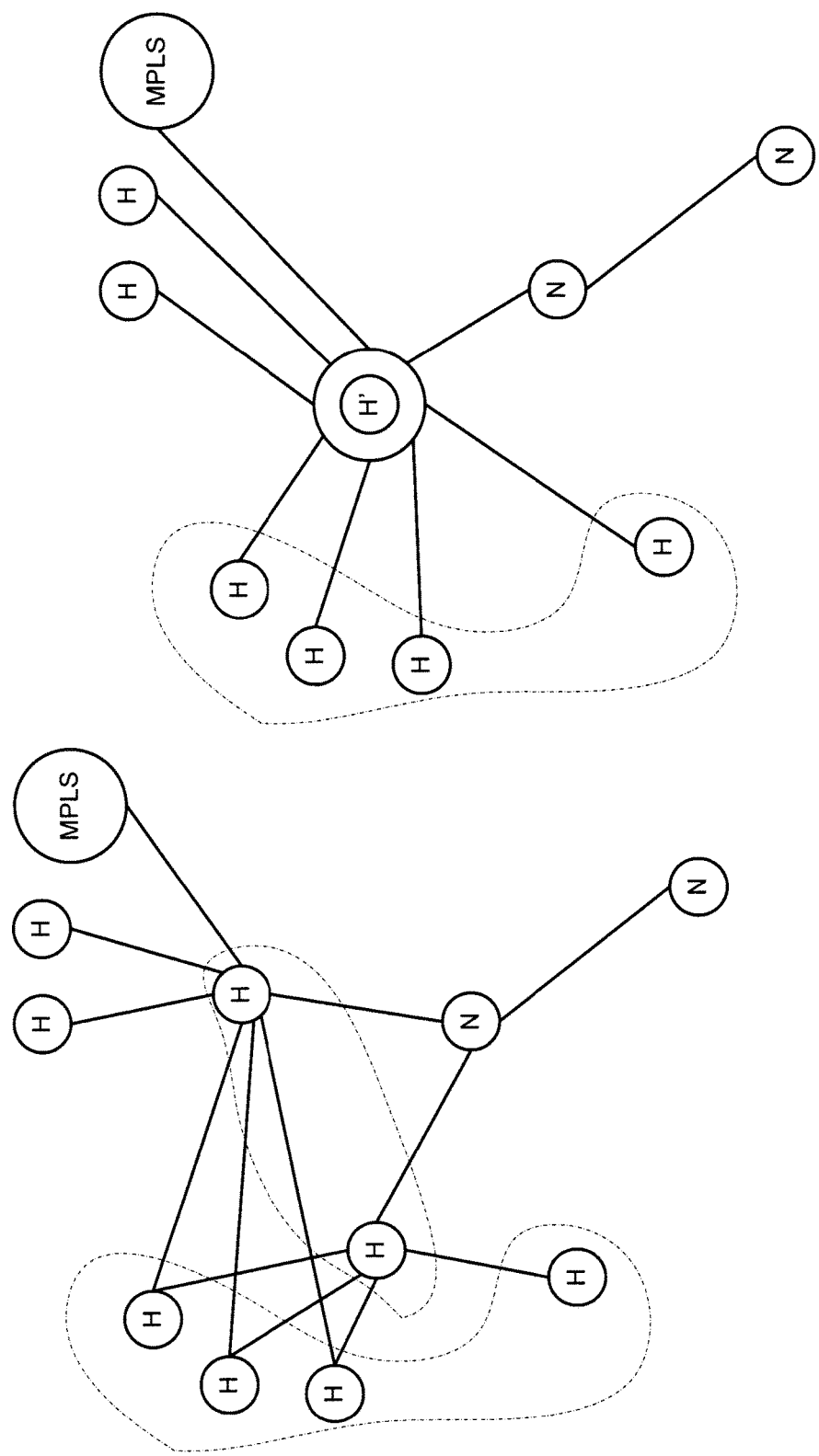
FIG. 3 illustrates a grouping of the clustered hosts.
Figure 5:
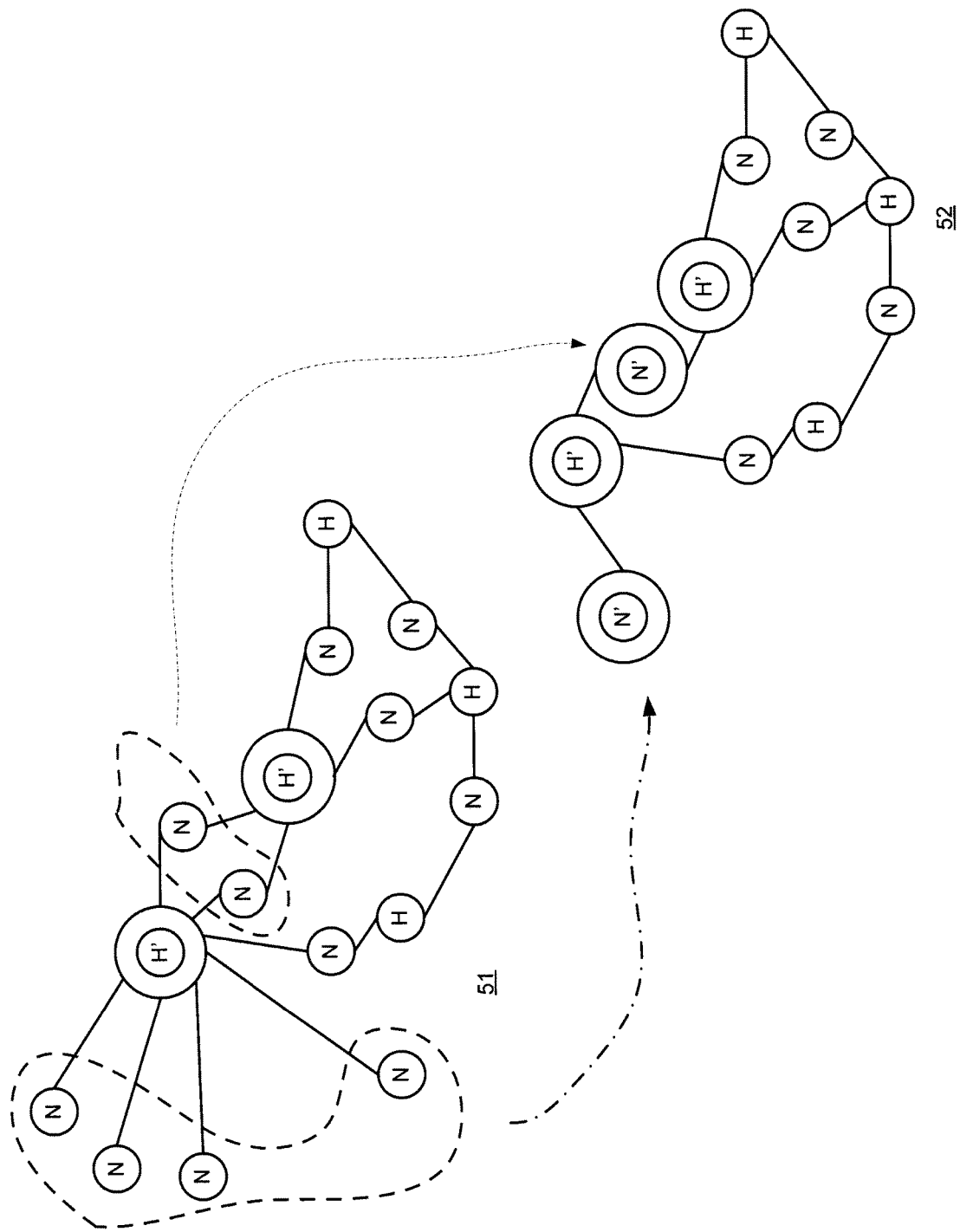
FIG. 5 illustrates a folding of networks after cluster host grouping.
Figure 7:
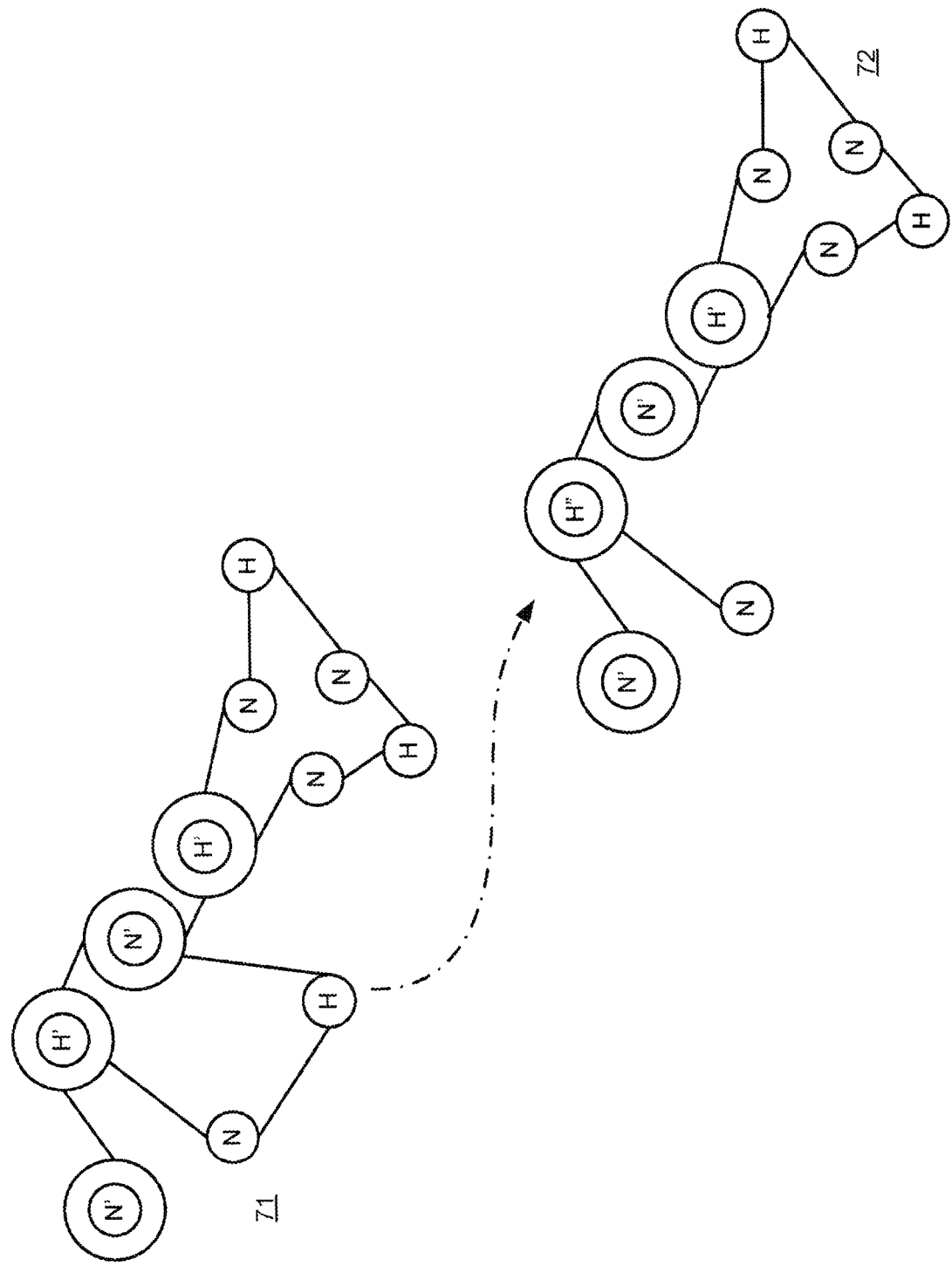
FIG. 7 illustrates a repeating the host and network grouping process.

FIG. 3 shows a conversion of graph 31 to graph 32—the conversion includes how two clustered hosts are unified into one group. In this example, the identity criterion was set to less than 70%.

Implementing the Second Stage

The implementation of this algorithm requires scanning of all the hosts and their adjacent network nodes and comparing them to other hosts.

FIG. 1 illustrates a pseudo code 40 for cluster host grouping.

Algorithm complexity is $n^3$ so it may be beneficial to improve.

This can be achieve that by using matching elimination:

a. A first filtering criterion can be that hosts need to have at least one network node in common for becoming candidates for matching. A quick pre-processing (with O(n) complexity) of the network will yield pairs of hosts for additional analysis.

b. Another elimination mechanism can check whether there is a major difference in the number of connections. For example, if host I has 100 connections and host J has 10 connections, there is no need to compare the two hosts.

In the next steps the process will use Betweenness Centrality for each network node. Since the two-host network node in the cluster should have similar values, there is no need to check network nodes with big difference in BC.

Once two hosts are grouped, the grouped hosts are eliminated from the list of matching candidates and this reduces the list size.

Setting the identity threshold to the right value

The threshold value can highly affect the amount of success of matching hosts. If the process sets the threshold to a high value, it might result in a low number of matching, while setting a low value might cause false matching. From empirical experiments with several models, it seems that 70-80% value can yield good prospects.

To reduce the algorithm's complexity even more, the Graph Modularity (Newman, M. E. J. (2006)) can be calculated. Checking if the two hosts network node does not resides in the same community can disqualify them as a cluster fast.

Third Stage—Grouping Cluster Network Nodes.

Cluster here is a Networking term, referring to two network nodes in the network serving a similar function, that act as a backup of one another. So for the purpose of understanding the network structure, they are almost identical.

Once the process has completed grouping clustered hosts, the process also needs to group clustered network nodes. Clustered network nodes should have identical hosts on both sides—in case two networks have the same hosts, these two networks will be grouped.

FIG. 2 illustrates folding Networks after cluster host grouping—converting graph 51 to graph 52.

Implementation

For this part the process can scan all the edges and see if they are connected to the hosts. Since the algorithm grouped two cluster hosts into one, the code needs to check if the connected hosts are grouped network nodes as well.

Improvement in run time can be achieved by checking if the networks have the same numbers of hosts connected to them FIG. 3 illustrates a pseudo code 60 of grouping networks after cluster host grouping Repeating Grouping Cluster Hosts and Folding Network Steps Once the network and host network nodes changed (grouped), the change in the graph might reveal more clustered host. Network node cluster may also be grouped, and the process can repeat these steps, until the process reaches zero grouping. Other stop criteria may be used.

FIG. 4 illustrates a repeating the host and network grouping process—converting graph 71 to graph 72.

Using Betweenness Centrality for Graph Grouping

After the completion of the clustering iterations—the network nodes are mapped to different layers of the visual representation of the network.

Once the process has detected all the clustered hosts and network nodes that differ from hosts and grouped them, the process needs to identify the hosts importance in the network and order them in layers according to their importance. The host importance BC will be determined according to the degree it is central in the graph, i.e., how many shortest paths in the graph from point A to point B, where point A and point B can be any point on the graph, pass through the network node. The process calculates BC per each network node on the graph and sort the host network nodes according to this value.

At this point the process needs to decide how may items the process would like to see on the screen in each layer. Let's take this parameter as K—being a maximal number allowable per layer—whereas the value of K may differ from one layer to another. The first layer may include first network nodes with had the highest BC value (BC with a highest range of BC values) in the first group. Every time the process groups host network node, the network nodes should be marked as grouped.

The process proceeds to create the second layer and repeatedly the layers below. These layers are created by scanning the network nodes in the upper layer, collecting all the network nodes connected to them. If the number of network nodes does not exceed the K value, then all these network nodes will be the content of this group. If the number of network nodes exceeds K, then the first K network nodes with the highest values will grouped into one group, the remaining network nodes will be divided into K numbered groups according to their BC values.

When all the network nodes have been scanned the created group (or groups) will be connected to the previous group as a father network node. This process shall continue until the process reaches the graph edge network nodes.

Once this process is completed the list of network nodes needs to be scan according to the BC values to make sure that no islands (a group of connected network nodes that are not connected to the mass majority of the rest of the graph) is left behind. If there are Islands found, the same process should start and the fathers of all these islands should be added to the root group of the graph.

This should prevent the situation where we zoom in (focus on a layer), we lose the connection between parts of the network just because we drop from the display some network nodes that used to connect these "islands". Think of a street in the map, when we lose the intersections on both sides of it when we zoom in.

Calculating Derived Edges

Due to the layering feature, by which only a subset of the network nodes is visible in each layer, a connection (edge) between two network nodes might not be visible from an upper level: assume network node a resides in group A, network node b resides in group B, and a and b are connected in the underlying network. From a higher zoom level, the user sees the groups but not the network nodes (thus he does not see a-b edge). The user should know that groups A and B are related (due to a-b connection) without having to zoom-in and inspect more detailed layers.

We define derived edges as follows:

a. Let x and y be connected network nodes.

b. Let groups X and Y be defined as X:={u|u is an ancestor of network node x}, Y:={u|u is an ancestor of network node y}.

The following three groups of edges are added and defined as derived edges:
E(Xy)={(u,y)|u is in X}, E(xY)={(x,u)|u is in Y}, E(XY)={(u,v)|u is in X, v is in Y}

Derived edges are added to the graph and assure that the user is aware of the graph connectivity, regardless of the current zoom level.

These edges may be added to the graph to mark some detailed path between network nodes that would show when we zoom in. They will illustrate connectivity between parts even when taking a higher-level view.

Figure 8:
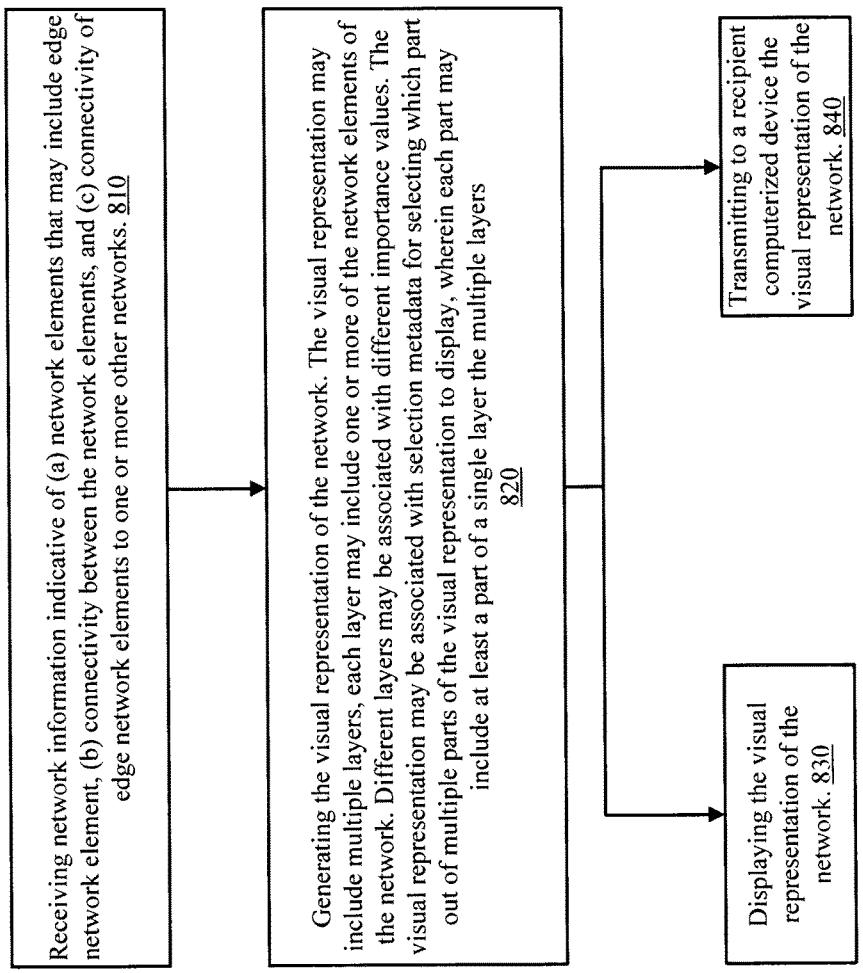
FIG. 8 illustrates an example of a method.

FIG. 8 illustrates an example of method 800 for providing a visual representation of a network.

Method 800 may start by step 810 of receiving network information indicative of (a) network elements that may include edge network element, (b) connectivity between the network elements, and (c) connectivity of edge network elements to one or more other networks.

Step 810 may be followed by step 820 of generating the visual representation of the network.

The visual representation may include multiple layers, each layer may include one or more of the network elements of the network. Different layers may be associated with different importance values.

The visual representation may be associated with selection metadata for selecting which part out of multiple parts of the visual representation to display, wherein each part may include at least a part of a single layer the multiple layers. The selection metadata may be a tag, a label or any other indication that states the level of a network node.

Each part may include at least one layer of the multiple layers.

Step 820 may include at least one of the following:
a. Clustering hosts based on topological similarities between the hosts.
b. Calculating, for each one of a pair of hosts, an identity parameter for the pair of hosts.
c. Calculating the identity parameter for a pair of hosts based on (a) a number of identical connections (Nident) of the pair of hosts, (b) a number of connections (Nmin) of a host that has a lowest number of connections out of all nodes of the network, and (c) a number (Nignore) of ignored network coupled to the network.
d. Calculating the identity parameter to equal Nident*Coefficient/(Nmin−Nignore). The Coefficient may be one hundred or may have any other value.
e. Performing one or more clustering iterations, each clustering iteration includes clustering network nodes based on topological similarities between one or more hosts of network nodes. Each network node may include one or more hosts.
f. One or more clustering iterations may include merging edge network nodes connected to a same network node.
a. The outcome of the one ore more clustering iteration may be a network that includes processed network nodes. A process network node may be a network node that was created by clustering, grouping or any other process, or a node that may be connected (directly or indirectly) to a network node that was generated by applying at least one processing operation of grouping or clustering, and the like.
b. Allocating processed network nodes to the multiple layers.
c. Allocating of the processed network nodes based, at least in part, on an importance of the processed network nodes.
d. Calculating the importance of the processed network nodes by calculating Betweenness Centrality of the processed network nodes.
e. Calculating the importance of the processed network nodes at least in part based on structural metadata that defines roles of network elements of the processed network nodes.
f. Searching for processed network islands isolated from a majority of processed network nodes.
g. Adding to a visual representation of a layer of the network, inter-layer connectivity indications indicative of a path that connects two network nodes of the layer, wherein the path passes through at least one other layer of the network.

Method 800 may also include step 830 of displaying the visual representation of the network.

Method 800 may also include step 840 of transmitting to a recipient computerized device the visual representation of the network.

Figure 9:
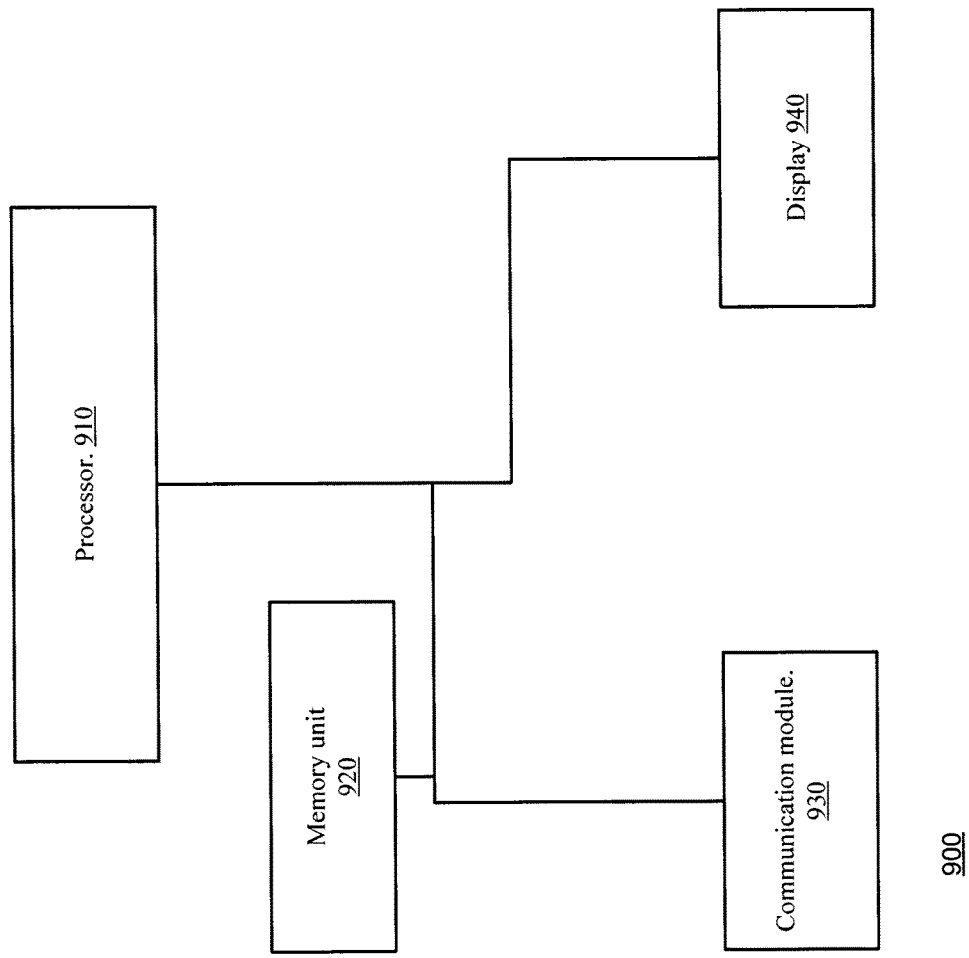
FIG. 9 illustrates an example of a computerized system.

FIG. 9 illustrates an example of a computerized system 900 that may include a processor 910, a memory unit 920 and a communication module 930.

The processor 910 may be a processing circuit or may include one or more processing circuit. The processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The communication module 930 may be or may include an Input/Output connector, port, module, and the like.

The memory unit 920 may store instructions, information for executing method 800.

The computerized system may include a display 940 for displaying the visual representation of the network or any part of the visual representation of the network.

The communication module 930 may transmit the visual representation of the network to another computer.

The computerized system 900 may be a laptop computer, a desktop computer, a server, a data center, a module communication device, a graphic accelerator, and the like.

Figure 10:
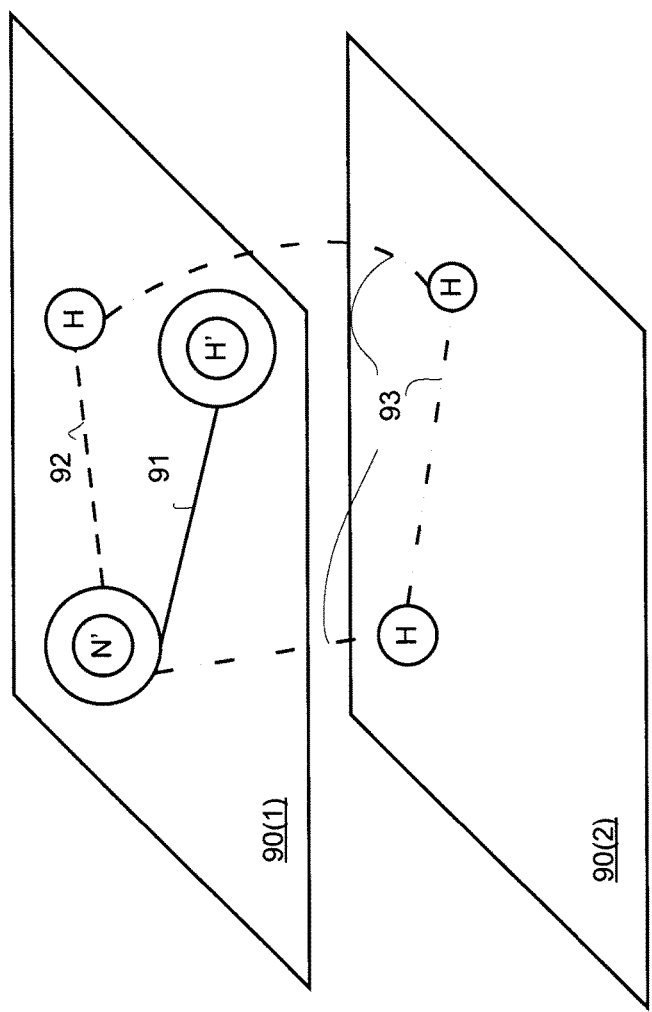
FIG. 10 illustrates layers and two types of connections.

FIG. 10 illustrates a multi-layered representation of the network—see for example layers 90(1) and 90(2). The number of layers may exceed two.

The first layer 90(1) illustrates a inner-layer connection 91 between two nodes of the first layer and an inter-layer connection 92 between two other layers—that represent a path 93 that links two network nodes of the first layer—but passed through nodes of the second layer 90(2).

Any reference to a system should be applied, mutatis mutandis to a method that is executed by a system and/or to a non-transitory computer readable medium that stores instructions that once executed by the system will cause the system to execute the method. The non-transitory computer readable medium is non-transitory and may be, for example, an integrated circuit, a magnetic memory, an optical memory, a disk, and the like.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including", "comprising", "having", "consisting" and "consisting essentially of" may be used instead of each other. For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also for example, in one embodiment, the illustrated examples may be implemented as circuit located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuit or of logical representations convertible into physical circuit, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component and/or unit of system that is illustrated in any of the figures and/or specification and/or the claims may be provided.

Any combination of any system illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for providing a visual representation of a network, the method comprises:
   receiving network information indicative of (a) network nodes that comprise edge network nodes, (b) connectivity between the network nodes; and (c) connectivity of edge network nodes to one or more other networks;
   generating the visual representation of the network, the visual representation comprises multiple layers, each layer comprises one or more of the network nodes of the network, wherein different layers are associated with different importance values; wherein the visual representation is associated with selection metadata for selecting which part out of multiple parts of the visual representation to display, wherein each part comprises at least a part of a single layer of the multiple layers;
   performing one or more clustering iterations, each clustering iteration comprises clustering network nodes based on topological similarities between one or more hosts of network nodes, the outcome of the one or more clustering iteration is a network that comprises processed network nodes;
   calculating, for each one of a pair of hosts, an identity parameter for the pair of hosts, wherein the identity parameter for the pair of hosts equals Nident*Coefficient/(Nmin−Nignore); and
   calculating of the identity parameter for a pair of hosts is based on (a) a number of identical connections (Nident) of the pair of hosts, (b) a number of connections (Nmin) of a host that has a lowest number of connections out of all nodes of the network, (c) a number (Nignore) of ignored networks coupled to the network; wherein each ignored network has a physical connection that is different from a logical connection of the network.

2. The method according to claim 1 wherein the network nodes comprise multiple hosts, wherein the multiple hosts are ordered to the multiple layers according to importance values of the multiple hosts; wherein the method comprises determining an importance value of a host of the multiple hosts based on a number of shortest path that pass through the host.

3. The method according to claim 1 wherein each clustering iteration comprises merging edge network nodes connected to a same network node.

4. The method according to claim 1 comprising allocating the processed network nodes to the multiple layers.

5. The method according to claim 4 wherein the allocating is based, at least in part, on an importance of the processed network nodes.

6. The method according to claim 5 comprising calculating the importance of the processed network nodes by calculating Betweenness Centrality of the processed network nodes.

7. The method according to claim 5 comprising calculating the importance of the processed network nodes at least in part based on structural metadata that defines roles of network nodes of the processed network nodes.

8. The method according to claim 1 wherein the generating of the visual representation comprises adding to a visual representation of a layer of the network, inter-layer connectivity indications indicative of a path that connects two network nodes of the layer, wherein the path passes through at least one other layer of the network.

9. The method according to claim 1 comprising displaying the visual representation of the network.

10. The method according to claim 1 comprising transmitting to a recipient computerized device the visual representation of the network.

11. A non-transitory computer readable medium that stores instructions for:
    receiving network information indicative of (a) network nodes that comprise edge network nodes, (b) connectivity between the network nodes, and (c) connectivity of edge network nodes to one or more other networks;
    generating a visual representation of the network, the visual representation comprises multiple layers, each layer comprises one or more of the network nodes of the network, wherein different layers are associated with different importance values; wherein the visual representation is associated with selection metadata for selecting which part out of multiple parts of the visual representation to display, wherein each part comprises at least a part of a single layer of the multiple layers;
    performing one or more clustering iterations, each clustering iteration comprises clustering network nodes based on topological similarities between one or more hosts of network nodes, the outcome of the one or more clustering iteration is a network that comprises processed network nodes;
    calculating, for each one of a pair of hosts, an identity parameter for the pair of hosts, wherein the identity parameter for the pair of hosts equals Nident*Coefficient/(Nmin-Nignore); and
    calculating of the identity parameter for a pair of hosts is based on (a) a number of identical connections (Nident) of the pair of hosts, (b) a number of connections (Nmin) of a host that has a lowest number of connections out of all nodes of the network, and (c) a number (Nignore) of ignored networks coupled to the network; wherein each ignored network has a physical connection that is different from a logical connection of the network.

12. The non-transitory computer readable medium according to claim 11 wherein the network nodes comprise multiple hosts, wherein the multiple hosts are ordered to the multiple layers according to importance values of the multiple hosts; wherein the method comprises determining an importance value of a host of the multiple hosts based on a number of shortest path that pass through the host.

13. The non-transitory computer readable medium according to claim 11 wherein the generating of the visual representation of the network comprises adding to a visual representation of a layer of the multiple layers, inter-layer connectivity indications indicative of a path that connects two network nodes of the layer, wherein the path passes through at least one other layer of the multiple layers.

14. The non-transitory computer readable medium according to claim 11 wherein each ignored network is selected out of a multiprotocol label switching C(MIPLS) network or a virtual private network CVPN} network.

* * * * *